(12) United States Patent
Matsumoto et al.

(10) Patent No.: US 11,951,427 B2
(45) Date of Patent: Apr. 9, 2024

(54) HOLLOW CYLINDRICAL FILTER AND MANUFACTURING APPARATUS

(71) Applicant: FUJI FILTER MANUFACTURING CO., LTD., Tokyo (JP)

(72) Inventors: Takashi Matsumoto, Tokyo (JP); Yutaka Yoshida, Tokyo (JP); Kiyohisa Kikuchi, Tokyo (JP)

(73) Assignee: FUJI FILTER MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/456,226

(22) Filed: Nov. 23, 2021

(65) Prior Publication Data

US 2022/0111320 A1 Apr. 14, 2022

Related U.S. Application Data

(63) Continuation of application No. 15/523,192, filed as application No. PCT/JP2015/080589 on Oct. 29, 2015, now abandoned.

(30) Foreign Application Priority Data

Oct. 30, 2014 (JP) ................................ 2014-221522

(51) Int. Cl.
*B01D 39/00* (2006.01)
*B01D 39/12* (2006.01)
(Continued)

(52) U.S. Cl.
CPC ......... *B01D 39/12* (2013.01); *B01D 46/0001* (2013.01); *B01D 46/24* (2013.01);
(Continued)

(58) Field of Classification Search
CPC .... B01D 39/12; B01D 46/0001; B01D 46/24; B01D 2279/10; B21B 1/16; B21B 1/166; B21C 37/04; B21F 27/18
(Continued)

(56) References Cited

U.S. PATENT DOCUMENTS 4,380,916 A 4/1983 Tanaka
4,478,260 A 10/1984 Eichler
(Continued)

FOREIGN PATENT DOCUMENTS

CN 101522282 A 9/2009
DE 3132974 A1 4/1982
(Continued)

OTHER PUBLICATIONS

EP Communication pursuant to Rule 114(2) EPC, observations by a third party dated Mar. 29, 2021 for European application No. 15853880.1, total 53 pages.
(Continued)

*Primary Examiner* — T. Bennett McKenzie
(74) *Attorney, Agent, or Firm* — MASUVALLEY & PARTNERS; Peter Martinez

(57) ABSTRACT

Embodiments of the present invention provide a hollow cylindrical filter for removing efficiently foreign substances from fluids. This is performed by forming complicated passages including an axial direction and a radial direction in the filter. The hollow cylindrical filter is formed by winding a metal wire rod in a spiral and multilayered manner. The metal wire rod includes a recess formed throughout the entire length in a longitudinal direction, or recesses repeated along said longitudinal direction. Some wire rod layers extend in an axial direction of the hollow cylindrical filter while the adjacent wire rod layers extend in an intersecting direction, thereby forming a plurality of
(Continued)

communication paths for communicating between the overlapping wire rod layers. Additionally, a space is formed between the recess of one wire rod layer and another adjacent wire rod layer, allowing the plurality of communication paths to communicate with each other.

6 Claims, 11 Drawing Sheets

(51) Int. Cl.
  *B01D 46/00* (2022.01)
  *B01D 46/24* (2006.01)
  *B21B 1/16* (2006.01)
  *B21C 37/04* (2006.01)
  *B21F 27/18* (2006.01)
(52) U.S. Cl.
  CPC ............... *B21B 1/16* (2013.01); *B21B 1/166* (2013.01); *B21C 37/04* (2013.01); *B21F 27/18* (2013.01); *B01D 2279/10* (2013.01)
(58) Field of Classification Search
  USPC .......................................................... 55/520
  See application file for complete search history.

(56) References Cited

U.S. PATENT DOCUMENTS

| | | |
|---|---|---|
| 5,849,054 A | 12/1998 | Fujisawa |
| 5,908,481 A | 6/1999 | Siddiqui |
| 6,699,540 B1 | 3/2004 | Tsukamoto |
| 2004/0112827 A1 | 6/2004 | May et al. |
| 2007/0169454 A1 | 7/2007 | Hirata |
| 2007/0193235 A1* | 8/2007 | Hirata ................... B01D 39/12 55/487 |
| 2007/0214768 A1 | 9/2007 | Koyama |
| 2009/0266132 A1* | 10/2009 | McDonald ............... B21H 1/20 72/235 |
| 2013/0152653 A1 | 6/2013 | Kosak et al. |
| 2014/0250847 A1 | 9/2014 | Emmons et al. |
| 2018/0093212 A1 | 4/2018 | Spatz |

FOREIGN PATENT DOCUMENTS

| | | | |
|---|---|---|---|
| JP | S59101202 A | | 6/1984 |
| JP | H05154503 A | | 6/1993 |
| JP | H07164006 A | | 6/1995 |
| JP | H11348712 A | | 12/1999 |
| JP | 2001171472 A | | 6/2001 |
| JP | 2002301317 A | * | 10/2002 |
| JP | 2002301317 A | | 10/2002 |
| JP | 2014237389 A | * | 12/2004 |
| JP | 2007302237 A | | 11/2007 |
| JP | 2009190656 A | | 8/2009 |
| JP | 2013126690 A | | 6/2013 |
| JP | 2014237389 A | * | 12/2014 |
| WO | 2008/143606 A1 | | 11/2008 |

OTHER PUBLICATIONS

Chinese Office Action dated May 6, 2020, issued for Chinese Application No. 201580058039.1, total 16 pages with English translation.
European Patent Office/ European Search Report dated Feb. 1, 2019 for European patent Application No. 15853880.1, 7 pages.
CNIPA, Chinese Office Action dated Jun. 10, 2022 in Chinese Patent Application No. 202110921794.5, 10 pages.

* cited by examiner

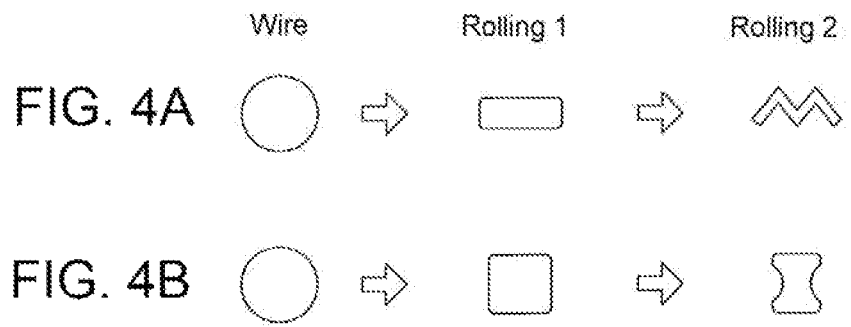
FIG. 4A
FIG. 4B
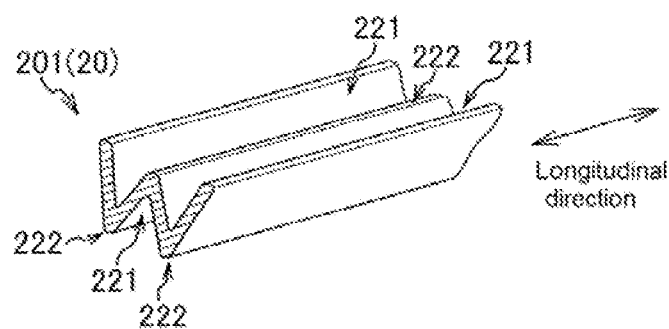
FIG. 5
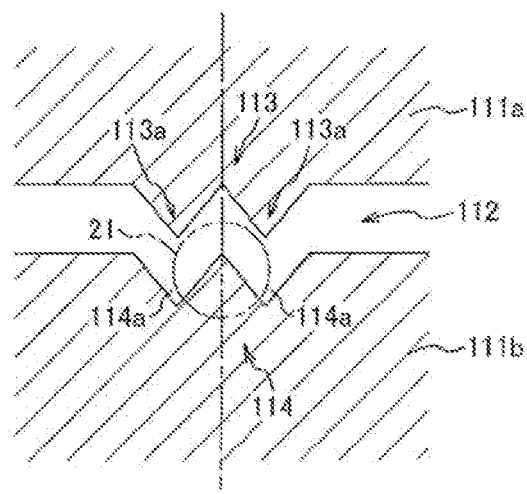
FIG. 6

Present invention

Conventional example

FIG. 10A
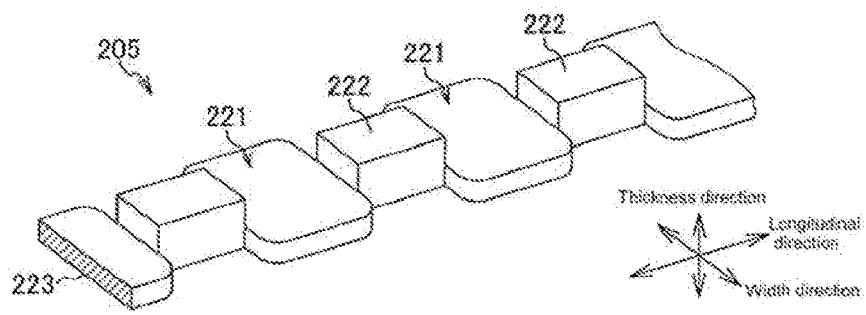
FIG. 10B
FIG. 10C
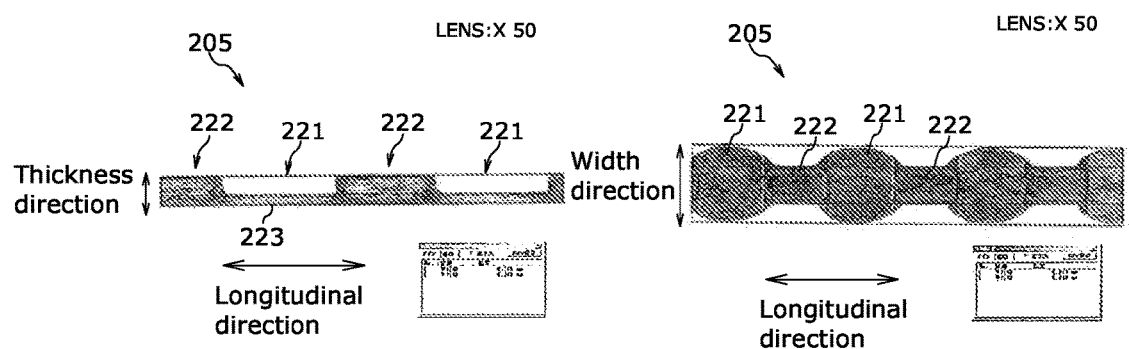
FIG. 11
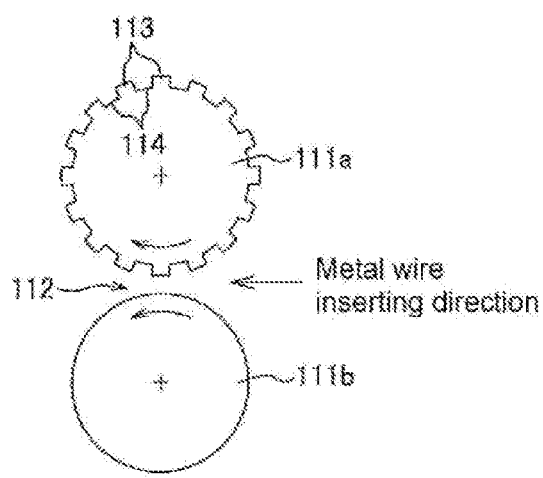

Trial example

Comparative example

HOLLOW CYLINDRICAL FILTER AND MANUFACTURING APPARATUS

RELATED APPLICATIONS

This application is a continuation of and claims priority to U.S. patent application Ser. No. 15/523,192 filed Apr. 28, 2017 entitled HOLLOW TUBULAR FILTER AND MANUFACTURING APPARATUS, which is a U.S. National Phase application under 35 U.S.C. § 371 of International Patent Application No. PCT/JP2015/080589, filed on Oct. 29, 2015, which claims priority under 35 U.S.C. § 119 to Japanese Patent Application No. 2014-221522, filed on Oct. 30, 2014, all of which are incorporated herein by reference in their entireties.

TECHNICAL FIELD

The present invention relates to a hollow cylindrical filter formed by winding a metal wire rod in a spiral and multilayered manner, and especially relates to a hollow cylindrical filter produced using an irregularly rolled metal wire rod and an apparatus for manufacturing the hollow cylindrical filter.

BACKGROUND ART

Hollow cylindrical filters formed by winding a metal wire rod in a spiral and multilayered manner are used in various fields as filters to remove foreign substances from various fluids. For example, Patent Document 1 (Japanese Patent Application Laid-Open No. 2001-171472) describes an airbag inflator filter for automobiles as an example of the hollow cylindrical filters.

The airbag inflator filter serves a function to filtrate a high-temperature gas containing a solid residue, which occurs due to ignition and explosive combustion of a gas-generating agent, and to cool the gas at the same time, as needed.

The airbag inflator filter described in Patent Document 1 is formed by rolling a metal wire having a complete circular shape in cross section, and winding a metal wire rod processed to have a rectangular shape in cross section in a spiral and multilayered manner at a predetermined angle and a predetermined pitch and arbitrarily sintering the metal wire rod.

SUMMARY OF THE INVENTION

Here, the filter described in Patent Document 1 filters the solid residue in the process of allowing the gas to pass from an inner diameter side to an outer diameter side. Since the cross-sectional shape of the metal wire rod that configures the filter is rectangle, the gas is mainly moved in a radial direction of the filter, and the gas cannot be moved in an axial direction or the peripheral direction.

The present invention has been made in view of the foregoing, and an objective is to provide a hollow cylindrical filter that can efficiently remove foreign substances, by forming complicated passages including the axial direction, the radial direction, and the peripheral direction in the filter, and an apparatus for manufacturing the hollow cylindrical filter.

To solve the above-described problem, the invention is a hollow cylindrical filter formed by winding a metal wire rod in a spiral and multilayered manner, wherein the metal wire rods that configure wire rod layers extend in a direction inclined with respect to an axial direction of the hollow cylindrical filter, the metal wire rods that configure the adjacent wire rod layers extend in directions intersecting with each other, to form a plurality of communication paths communicating in a direction into which the wire rod layers overlap with each other, and a space that allows the plurality of communication paths to communicate with each other is formed by a recess formed in the metal wire rod that configures at least one of the wire rod layers, between the metal wire rod that configures one wire rod layer and the metal wire rod that configures another wire rod layer adjacent to the one wire rod layer.

In the invention, the metal wire rod includes the recess formed along a longitudinal direction.

In the invention, the metal wire rod includes the recesses repeated along a longitudinal direction.

In the invention, the metal wire rod includes the recesses repeated in a direction intersecting with a longitudinal direction.

In the invention, the metal wire rod includes thick narrow portions and thin wide portions repeated along a longitudinal direction.

In the invention, a back side of the metal wire rod in which the recess is formed is a flat surface.

In the invention, the metal wire rod is arranged such that the recess faces an upstream side of a fluid to be filtrated.

In the invention, the metal wire rod is arranged such that the recess faces a downstream side of a fluid to be filtrated.

In the invention, the metal wire rod includes a first metal wire rod portion extending in a longitudinal direction, and a second metal wire rod portion arranged in a different position from the first metal wire rod portion in the longitudinal direction and having a different external shape, the recess is formed in at least one of the metal wire rod portions.

The invention is an apparatus for manufacturing the hollow cylindrical filter, the apparatus including: a rolling device including a pair of rolling rollers arranged to face each other, and configured to sandwich a metal wire and form the metal wire rod having a predetermined cross-sectional shape; and a winding device configured to wind the metal wire rod formed by the rolling device around a core rod to form a hollow cylindrical body, wherein the pair of rolling rollers includes a first metal wire rod forming portion that forms the first metal wire rod portion and a second metal wire rod forming portion that forms the second metal wire rod portion in different positions in the axial direction, and the rolling device includes guide means that moves forward and backward along the axial direction of the pair of rolling rollers to guide the metal wire to the first metal wire rod forming portion or the second metal wire rod forming portion.

According to the present invention, the communication paths can communicate with one another in the axial direction, a radial direction, and a peripheral direction, by the space formed between the recess of the metal wire rod and the metal wire rod. Therefore, complicated passages can be formed in the filter, and foreign substances can be efficiently removed.

BRIEF DESCRIPTION OF THE DRAWINGS

FIGS. 4A and 4B are sectional views illustrating examples of a metal wire rod obtained when rolling is conducted twice for a metal wire.

FIG. 5 is a perspective view illustrating a metal wire rod for forming a filter according to a first embodiment of the present invention.

FIG. 6 is a sectional view illustrating an example of a rolling roller for producing the metal wire rod illustrated in FIG. 5.

FIG. 7A is a diagram illustrating an example of the metal wire rod having a W shape in cross section according to the first embodiment of the present invention and FIG. 7B is a diagram illustrating an example of a conventional metal wire rod having a rectangular shape in cross section.

FIG. 8A is a diagram illustrating an example of the filter using the metal wire rod having a W shape in cross section according to the first embodiment of the present invention and FIG. 8B is a diagram illustrating a conventional example.

FIGS. 10A to 10C are diagrams illustrating a metal wire rod according to a second embodiment of the present invention, and FIG. 10A is a perspective view, FIG. 10B is a photograph of a side surface, and FIG. 10C is a photograph of a top surface.

FIG. 11 is a schematic diagram of a rolling roller for manufacturing the metal wire rod according to the second embodiment of the present invention.

FIG. 17A is a schematic diagram of a metal wire rod that configures the hollow cylindrical filter and FIG. 17B is a sectional view of the hollow cylindrical filter.

BEST MODE FOR CARRYING OUT THE INVENTION

Figure 1:
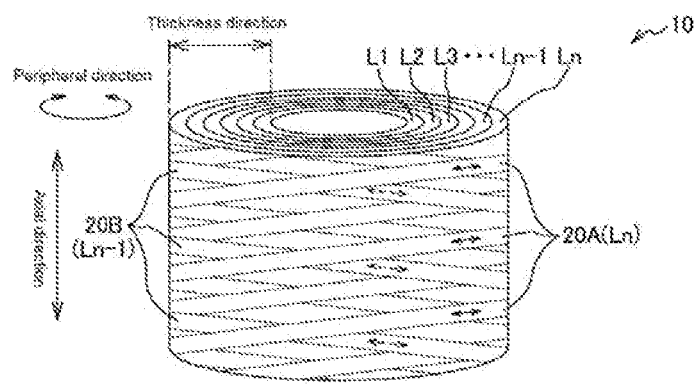
FIG. 1 is a schematic perspective view of a filter according to an embodiment of the present invention.

Hereinafter, the present invention will be described in detail using embodiments illustrated in the drawings. Note that configuration elements, types, combinations, shapes, its relative arrangement, and the like described in the embodiments are mere examples and are not intended to limit the scope of the invention thereto unless otherwise specifically stated.

Shape of Filter

FIG. 1 is a schematic perspective view of a filter according to an embodiment of the present invention.

A hollow cylindrical filter (hereinafter, referred to as filter) 10 according to an embodiment of the present invention is formed by winding, at least one metal wire rod 20, in a spiral and multilayered manner with a fixed inclined angle with respect to an axial direction (in an up and down direction in FIG. 1). Here, individual layers wound in the same direction are referred to as wire rod layers L1, L2, L3, and the like. The metal wire rods that configure the wire rod layers L1, L2, L3, and the like extend in the same direction inclined with respect to the axial direction of the hollow cylindrical filter in front view, and the metal wire rods that configure the adjacent wire rod layers extend in directions intersecting with each other (not parallel).

The direction into which a wire rod 20A (illustration of the thickness is omitted) that configures an outermost wire rod layer Ln in FIG. 1 extends is the direction illustrated by the solid arrows, and the direction into which a wire rod 20B that configures an immediate next inner wire rod layer Ln-1 extends is the direction illustrated by the broken arrows.

That is, the filter 10 includes one wire rod layer (for example, the wire rod layer L1) formed by winding the metal wire rod 20 in a spiral manner at a fixed inclined angle with respect to the axial direction, and another wire rod layer (for example, the wire rod layer L2) formed by winding the metal wire rod in a spiral manner over an outer peripheral side of the one wire rod layer L1 at an inclined angle different from the metal wire rod that configures the one wire rod layer L1. The metal wire rods that respectively configure the one wire rod layer L1 and the other wire rod layer L2 adjacent to the one wire rod layer L1 are configured to be non-parallel to the axial direction and to intersect with each other.

Note that the inclined angle of the metal wire rod that configures the wire rod layer with respect to the axial direction may be configured to be changed in one wire rod layer.

The filter 10 is used to remove unnecessary substances from various fluids such as a liquid and a gas, and is also used to cool the fluid that passes through the filter at the same time depending on use. Further, first, the filter is configured to form a passage through which the fluid passes in a direction into which the wire rod layers overlap with each other (thickness direction), that is, a radial direction of the filter. The fluid may be brought to pass through the filter from an inner diameter side to an outer diameter side, or from the outer diameter side to the inner diameter side. Here, the radial direction is not a diameter direction (radial direction) in a strict sense, and means a roughly radial direction with respect to the axial direction and a peripheral direction.

Sizes (the dimension in the axial direction, the diameter, the thickness, and the like) of the filter are appropriately determined according to the structure and the size of a filter device equipped with the filter.

Examples of types of metal used as material of the filter include iron, mild steel, stainless steel, a nickel alloy, and a copper alloy. Among them, austenitic stainless steel (SUS 304) is favorable.

The thickness and the cross-sectional shape of the metal wire rod used for the filter are appropriately determined according to the size of the filter, the substance removed by the filter, a pressure loss, and the like.

As the filter, a metal wire rod having a predetermined cross-sectional shape is used, which is obtained by rolling a metal wire having a complete circular shape in cross section to have an irregular shape in cross section (hereinafter, this process is referred to as irregular rolling). The shape of the metal wire rod will be described below.

Note that an irregular shape is typically defined as "an unusual shape/form different from the normal". Here, the irregular shape broadly includes the cross-sectional shape of the wire rod having an irregular shape throughout the entire length in a longitudinal direction, such as a W shape, a U shape, a J shape, an L shape, an X shape, or shapes like something, as against the cross-sectional shape of the metal wire rod having a regular shape throughout the entire length, such as a circle, an oval, or a polygon. Further, the irregular shape also include a cross-sectional shape or an external shape of the wire rod not constant throughout the entire length in the longitudinal direction of the wire rod, and a configuration having a different cross-sectional shape or a different external shape depending on a position in the longitudinal direction.

Filter Manufacturing Apparatus and Manufacturing Method

Figure 2:
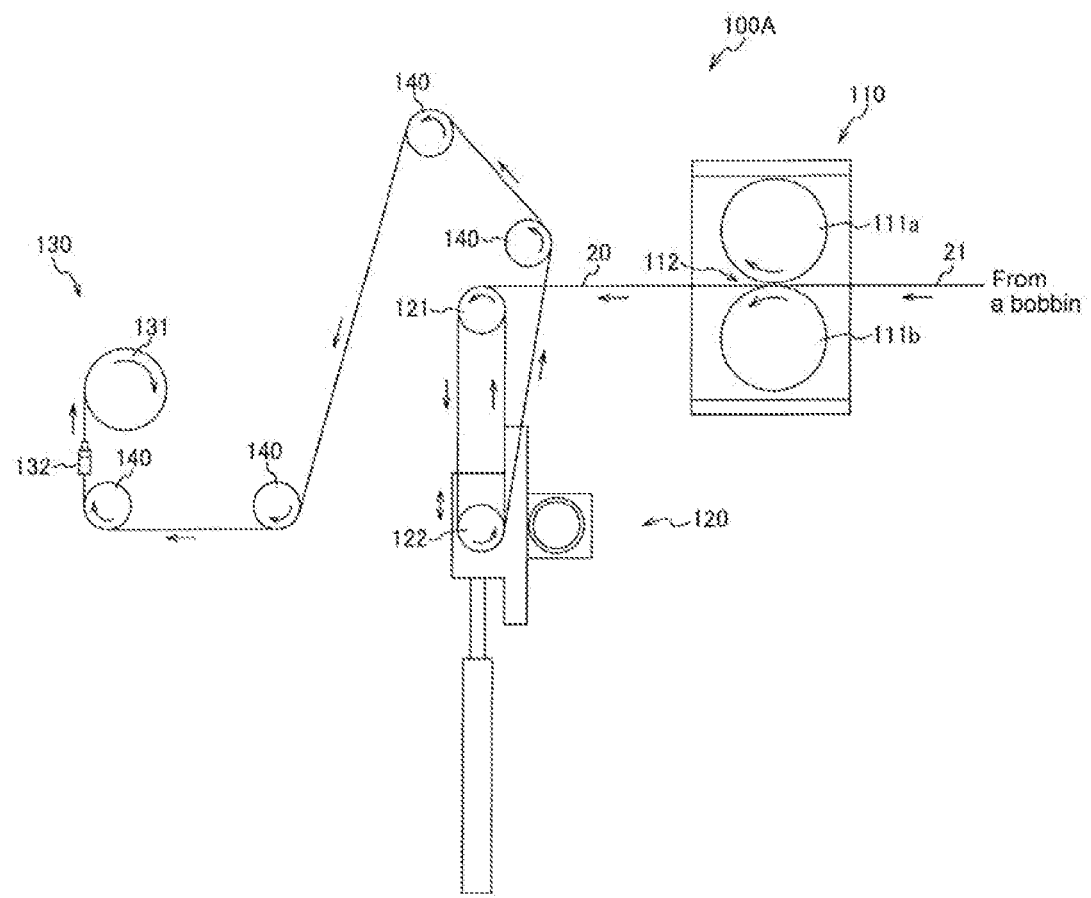
FIG. 2 is a schematic diagram illustrating an example of a filter manufacturing apparatus.

FIG. 2 is a schematic diagram illustrating an example of a filter manufacturing apparatus. This apparatus produces a hollow cylindrical body from the metal wire rod.

A manufacturing device 100A roughly includes a rolling device 110 that rolls a metal wire 21 supplied from a bobbin (not illustrated), a tension unit 120 that provides the metal wire (hereinafter, referred to as "metal wire rod 20") after the cross-sectional shape is deformed by the rolling with predetermined tension in a longitudinal direction, and a winding device 130 that winds the metal wire rod 20 around a core rod 131 to form a hollow cylindrical body. Further, a plurality of conveyance rollers 140 that conveys the metal wire rod while guiding the metal wire rod is arranged on a conveyance path of the metal wire rod 20.

The rolling device 110 includes two columnar rolling rollers 111a and 111b that are arranged to face each other and rotate. A portion where surfaces (facing surfaces) of the rolling roller 111a and the rolling roller 111b come in contact with each other configures a pressurizing portion 112 that sandwiches the metal wire 21 and deforms the metal wire 21 to have a desired shape. The rolling device 110 plastically deforms the metal wire 21 in the pressurizing portion 112 under predetermined temperature and pressure, thereby to obtain the metal wire rod 20 having a predetermined cross-sectional shape. The rolling may be cold rolling or hot rolling.

A projection portion and/or a recess portion for rolling the metal wire to have the desired cross-sectional shape is formed in one or both of the surfaces of the rolling rollers 111a and 111b. When the metal wire passes through the pressurizing portion 112, the metal wire is rolled with the projection portion and/or the recess portion to be plastically deformed and is processed into the metal wire rod having an irregular cross-sectional shape.

The tension unit 120 includes a fixed roller 121 fixed and arranged in a predetermined position in a freely rotatable state, and a freely rotatable movable roller 122 moved close to or away from the fixed roller 121. The tension unit 120 causes the movable roller 122 to be moved close to or away from the fixed roller 121 to provide predetermined tension to the metal wire rod 20 that is wound around and conveyed by the fixed roller 121 and the movable roller 122.

The winding device 130 includes a core rod 131 rotated at a predetermined speed in a fixed direction, and a guide member 132 that reciprocates at a predetermined speed in an axial direction of the core rod 131 (a direction perpendicular to the sheet surface in FIG. 2) and guides the metal wire rod 20. The core rod 131 has an approximately columnar shape or cylindrical shape, and is typically formed of metal such as stainless steel, a copper alloy, or an aluminum alloy.

To produce the hollow cylindrical body, an end of the metal wire rod 20 is hooked on an appropriate place of the core rod 131, and the core rod 131 is rotated in the fixed direction in a state where the predetermined tension is provided to the metal wire rod 20 in the tension unit 120, and the metal wire rod 20 is reciprocated in the axial direction of the core rod 131 by the guide member 132. With this operation, the metal wire rod 20 is wound around an outer periphery of the core rod 131 in a spiral and multilayered manner. Further, the metal wire rods that configure the adjacent wire rod layers intersect with each other to form a net.

For example, while, in the first metal wire rod layer directly wound around the outer periphery of the core rod 131, the wire rods are inclined in a clockwise direction by a predetermined angle θ with respect to the axial direction of the core rod in FIG. 1, the wire rods that configure the second metal wire rod layer wound around an outer periphery of the first metal wire rod layer are inclined in a counterclockwise direction by a predetermined angle θ with respect to the axial direction of the core rod.

After the metal wire rod 20 is wound a predetermined number of times (a predetermined number of hierarchies), the metal wire rod 20 is cut, then, a cut end portion is joined to an appropriate place of the wound-up wire rod by spot welding or the like, and the metal wire rod 20 is removed from the core rod 131, whereby the hollow cylindrical body is obtained.

The angle (winding angle) of the metal wire rod 20 with respect to the axial direction of the core rod 131, and an interval (pitch) between the metal wire rods 20 adjacent in the axial direction can be changed by appropriately adjusting a ratio of a rotation speed of the core rod 131 and a moving speed of the guide member 132. By appropriately changing the thickness, the winding angle, the pitch, and the number of turns of the metal wire rod, the pressure loss of the fluid that passes through the filter can be controlled to an appropriate value.

Although the hollow cylindrical body manufactured by the manufacturing device 100A can be used as a filter as it is, the hollow cylindrical body is favorably sintered at a high temperature. Although the temperature in sintering differs according to the type, the thickness, the number of turns, the pitch, and the winding angle of the metal wire, the sintering is performed in a range of 500 to 1500 degrees (° C.). In the range, 1100 to 1201 degrees is favorable.

The sintering is performed to reduce internal strain of the metal wire rod, which has been caused in the rolling, and to join portions where the metal wire rod overlap with each other. The sintering is favorably conducted in an electric furnace set to a predetermined temperature, and a sintering time is favorably selected from a range of 30 to 80 minutes although it differs according to the type, the thickness, the number of turns, the winding density, the pitch, and the sintering temperature of the metal wire rod. Although the sintering can be performed in the air, the sintering is favorably performed in vacuo or in an inert gas where the metal wire rod is free from risk of embrittlement and a chemical reaction. Examples of the inert gas include a nitrogen gas and an argon gas. Between them, the nitrogen gas is favorable.

Figure 3:
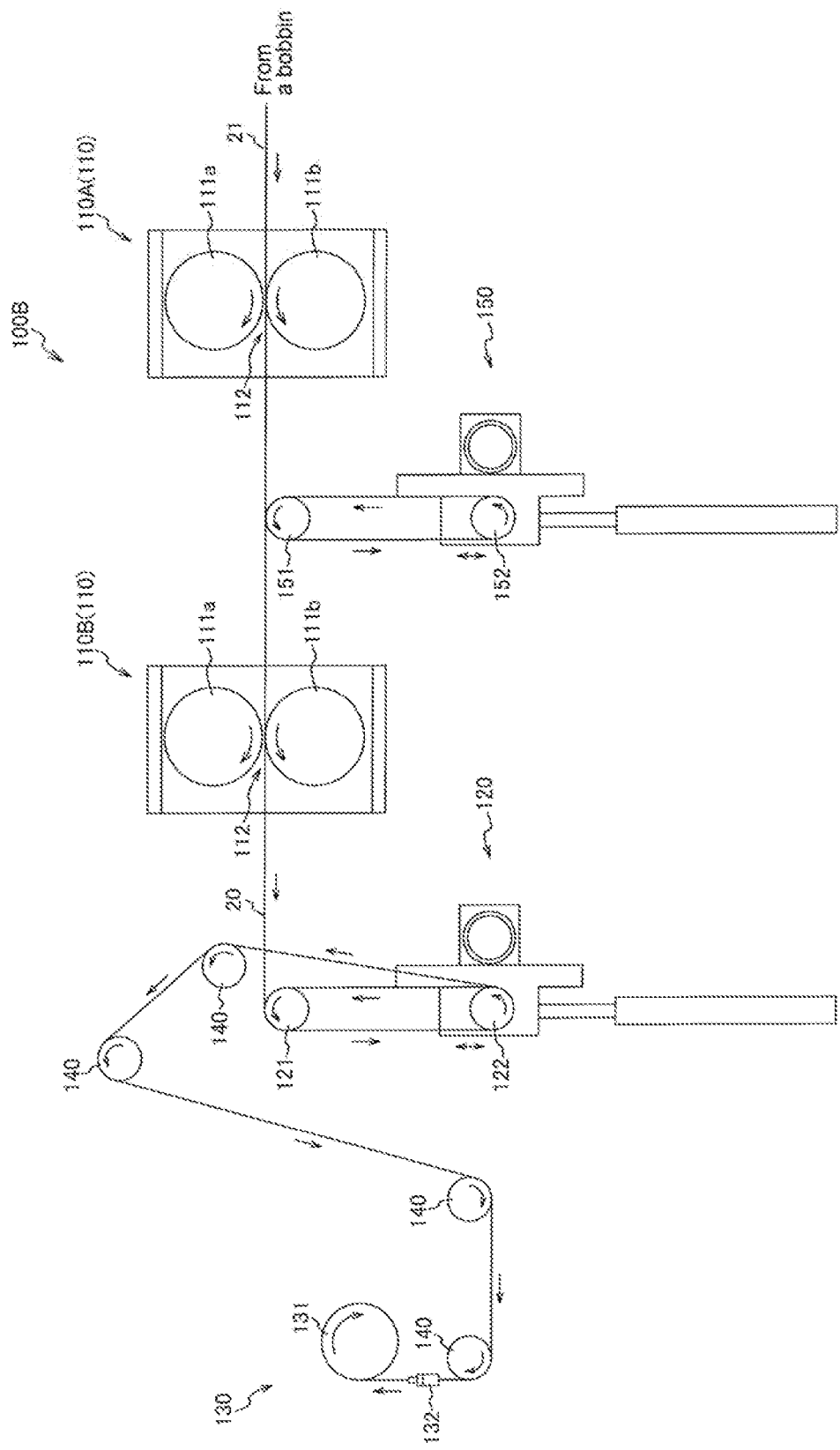
FIG. 3 is a schematic diagram illustrating another example of the filter manufacturing apparatus.

FIG. 3 is a schematic diagram illustrating another configuration example of a filter manufacturing apparatus 100B. The manufacturing device 100B includes a plurality of rolling devices 110 (110A and 110B) on the conveyance path of the metal wire 21, and can conduct a plurality of times of rolling for the metal wire 21.

In a case where the plurality of rolling devices is arranged in the manufacturing device 100B, a buffer unit 150 may be arbitrarily inserted between the rolling devices 110A and 110B. The buffer unit 150 includes a fixed roller 151, a shaft center of which is fixed to a predetermined position in a freely rotatable state, and a freely rotatable movable roller 152 moved close to or away from the fixed roller 151. The metal wire rolled by the rolling device 110A in the first stage is wound around the fixed roller 151 and the movable roller 152. The buffer unit 150 causes the movable roller 152 to be moved close to or away from the fixed roller 151 to synthesize the rolling device 110A and the winding device 130 or absorb a processing speed difference between the rolling devices 110A and 110B.

In a case of conducting a plurality of times of rolling, rolling directions of the metal wire 21 by the rolling devices 110A and 110B may be the same direction or may be different directions.

FIGS. 4A and 4B are sectional views illustrating examples of a metal wire rod obtained when rolling is conducted twice for a metal wire. In a case of conducting a plurality of times of rolling for the metal wire, the metal wire rod having a more complicated external shape than a case of conducting rolling once. Further, by conducting a plurality of times of rolling, an effect to stabilize the shape of the metal wire rod can be obtained.

Metal Wire Rod

Hereinafter, the shape of the metal wire rod that forms the filter will be specifically described. The filter according to the present invention is characterized to be produced from the metal wire rod having the recess (or the projection) in an outside surface, which is formed by the irregular rolling. Especially, the metal wire rod is characterized to have the recess continuously formed throughout the entire length in the longitudinal direction, or the recesses repeated along the longitudinal direction.

Note that, the "repeat" here refers to a state in which the recesses are separated and intermittently (discontinuously) arranged. That is, the "repeat" means that portion where the recess is formed and a portion where no recess is formed alternately exist along the longitudinal direction of the metal wire rod, and the recess is discontinuous in the longitudinal direction of the metal wire rod. Note that the pitch of the recesses may be constant (in a regular manner) or may be in an irregular manner.

First Embodiment

FIG. 5 is a perspective view illustrating a metal wire rod for forming a filter according to a first embodiment of the present invention. A metal wire rod 201(20) includes a recess 221 continuously extending throughout the entire length in a longitudinal direction. A cross-sectional shape in a direction perpendicular to the longitudinal direction of the metal wire rod 201 is an approximate W shape. Two recesses 221 and one projection 222 are formed in one side (surface) of the metal wire rod 201, the one side intersecting with the longitudinal direction, and one recess 221 and two projections 222 are formed in the other side (surface).

FIG. 6 is a sectional view illustrating an example of a rolling roller used to manufacture the metal wire rod illustrated in FIG. 5. FIG. 6 illustrates a state in which the rolling roller is cut in plane including a central axis of the roller. A rolling roller 111a includes, on an outer surface, a molding portion 113 including two projection portions 113a protruding in a V-shaped manner throughout the entire periphery in a peripheral direction. A rolling roller 111b includes, in an outer surface, a molding portion 114 including two recess portions 114a depressed in a V-shaped manner throughout the entire periphery in the peripheral direction. The molding portion 113 and the molding portion 114 are in one-on-one corresponding relationship, and the projection portion 113a and the recess portion 114a are fit in a nip portion of both the rolling rollers. By inserting a metal wire 21 into a pressurizing portion 112 formed of the molding portion 113 and the molding portion 114, and compressing the metal wire 21, the metal wire rod 201 illustrated in FIG. 5 is obtained.

Figure 7B:
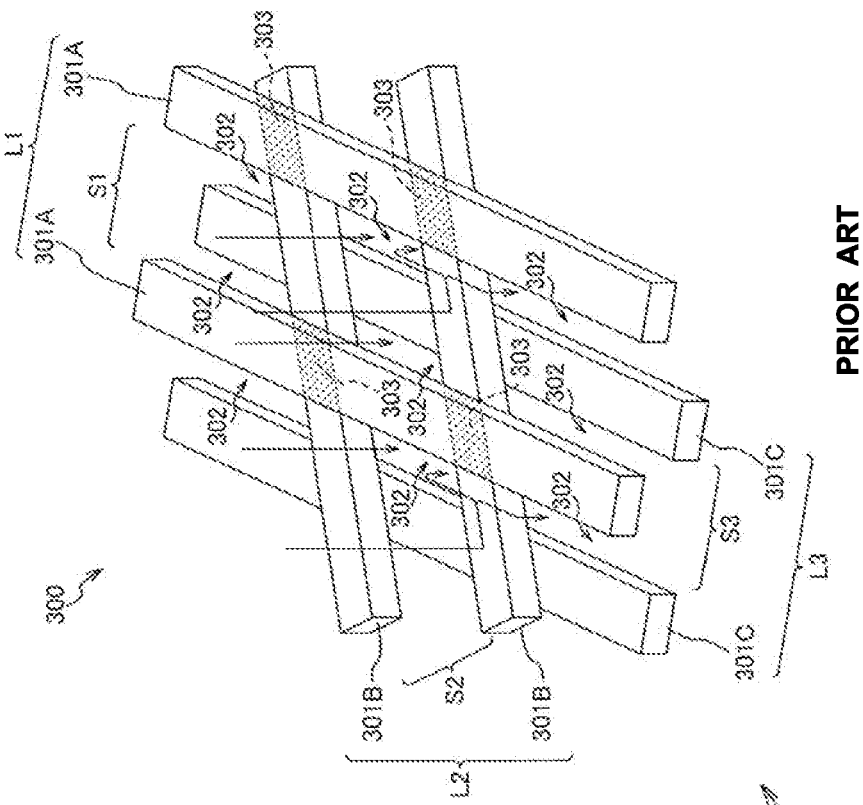
FIGS. 7A and 7B are schematic diagrams illustrating an enlarged portion where metal wire rods intersect in a filter.
Figure 7A:
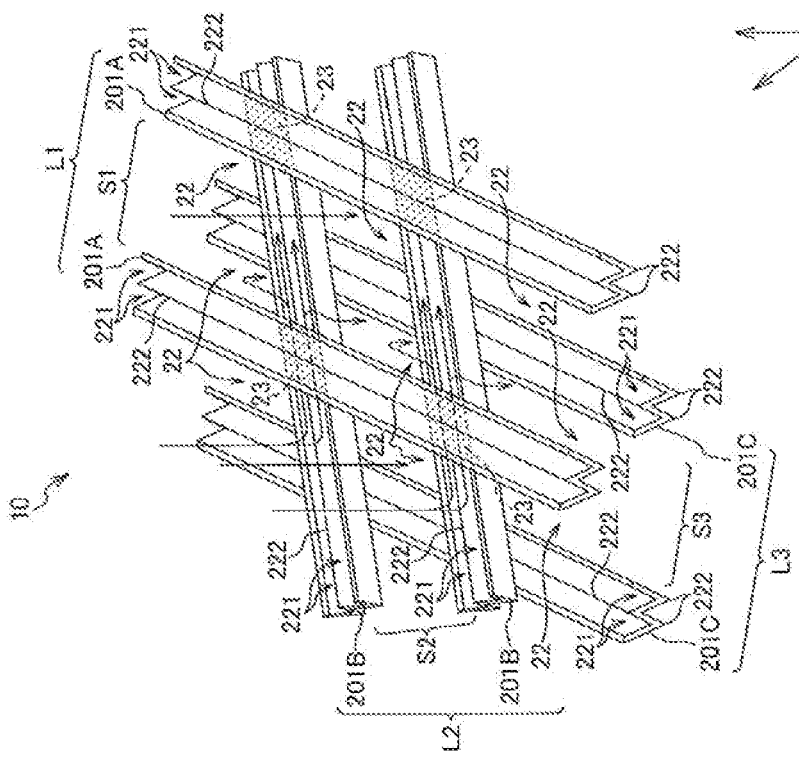

FIGS. 7A and 7B are schematic diagrams illustrating an enlarged portion where the metal wire rods intersect in a filter, and FIG. 7A is a diagram illustrating an example of the metal wire rod having the W shape in cross section according to the first embodiment of the present invention and FIG. 7B is a diagram illustrating an example of a conventional metal wire rod having a rectangular shape in cross section.

In a conventional filter 300 illustrated in FIG. 7B, metal wire rods 301A, 301B, 301C, and the like that configure adjacent wire rod layers L1, L2, L3, and the like extend in directions intersecting with one another, thereby to form a spiral space S1 in a spiral manner between the metal wire rods 301A that configure the one wire rod layer L1, and a spiral space S2 in a spiral manner between the metal wire rods 301B that configure the another wire rod layer L2 adjacent to the one wire rod layer. A plurality of communication paths 302 that allows the spiral spaces to communicate with each other is formed in a direction into which the wire rod layers overlap with one another (inner/outer diameter directions of the filter). The communication paths 302 are formed in a net-like manner, and allow a fluid to mainly pass in the direction into which the wire rod layer overlap with one another.

In the conventional filter 300, the metal wire rod 301A and the metal wire rod 301B closely adheres to each other in an intersection portion 303, and thus the fluid cannot be moved across the wire rod in the intersection portion. Therefore, the fluid mainly flows in the radial direction of the filter, and rarely flows in a peripheral direction and an axial direction.

In a filter 10 according to the present embodiment illustrated in FIG. 7A, metal wire rods 201 that configure adjacent wire rod layers extend in directions intersecting with each other, similarly to the conventional filter 300, so that a plurality of communication paths (in an overlapping direction) 22 that allows a fluid to mainly pass in a direction into which the wire rod layers overlap with one another (a radial direction of the filter) is formed.

In the filter 10 according to the present embodiment, an intersection portion space 23 where the fluid can pass is formed by a metal wire rod 201A that configures one wire rod layer L1 and recesses 221 of a metal wire rod 201B that configures another wire rod layer L2 adjacent to the one wire rod layer L1, in an intersection portion (the shaded portion in FIG. 7A) between the metal wire rod 201A and the metal wire rod 201B. The intersection portion space 23 is a space that allows the plurality of communication paths 22 to communicate with one another, the communication paths 22 extending in the direction into which the wire rod layers overlap with one another. The intersection portion space 23 allows the fluid to be moved in a direction intersecting with a longitudinal direction of the metal wire rod 201A in the metal wire rod 201A, that is, allows the fluid to be moved in the peripheral direction and the axial direction of the filter within one wire rod layer.

Therefore, in the filter 10 according to the present embodiment, the fluid can pass in the radial direction while being spread and moved in a peripheral direction and an axial direction of the filter, and other various directions (multiple directions) by the intersection portion spaces 23 and the communication paths 22.

Figure 8A:
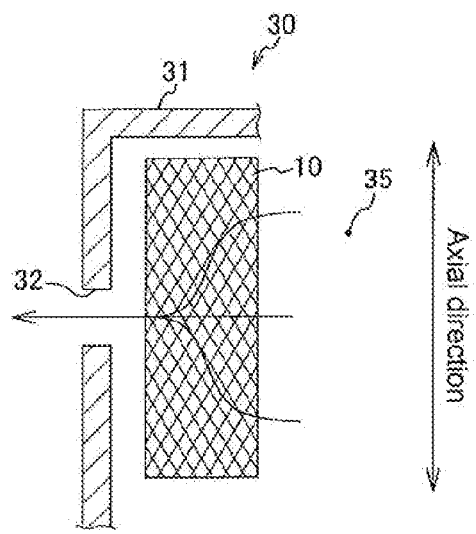
FIGS. 8A and 8B are schematic diagrams for describing a passing state of a fluid in a filter.
Figure 8B:
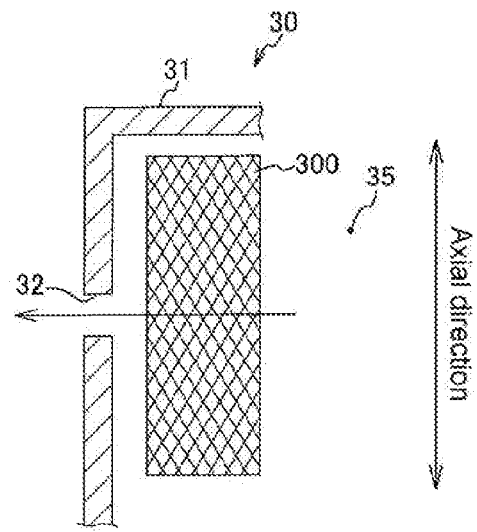

FIGS. 8A and 8B are schematic diagrams for describing a passing state of a fluid in a filter, and FIG. 8A is a diagram illustrating an example of the filter using the metal wire rod having a W shape in cross section according to the first embodiment of the present invention and FIG. 8B is a diagram illustrating a conventional example.

A filter device 30 includes a housing 31 that accommodates the filter 10 or 300, and a through hole 32 is formed in the housing 31. The through hole 32 allows an inside and an outside of the housing to communicate with each other, and allows the fluid passing through the filter 10 or 300 to flow to the outside. The housing 31 functions as a reinforcing member when pressure of the fluid is extremely high.

In a case where the size of the through hole 32 as an outlet of the fluid is restricted with respect to an area of an outer peripheral portion of the filter, the fluid rarely flows in the axial direction of the filter 300 in the conventional filter 300 using the metal wire rod having a rectangular shape in cross section, as illustrated in FIG. 7B, the fluid linearly flows from an inner diameter-side space 35 of the filter 300 to an outer-diameter side toward the through hole 32, and only a part of the filter 300 is used to capture a foreign substance (FIG. 8B).

In contrast, in the filter 10 of the present embodiment, the fluid flows in the intersection portion space 23 formed by the recesses 221, as illustrated in FIG. 7A, and thus the fluid flows in a thickness portion of the filter 10 in the peripheral direction and the axial direction, and other various directions. As a result, the fluid flows from the inner diameter-side space 35 of the filter 10 to pass through complicated paths toward the through hole 32 while moving in the in peripheral direction and the axial direction. As compared with the conventional case, a wider range of the filter is used for filtration of the foreign substance, so that a contact area with the fluid is rectangular shape in cross section increased, and capture of the foreign substance and heat exchange between the fluid and the filter are efficiently performed (FIG. 8A).

Effect

In the filter according to the present embodiment, the recessed space in which the fluid passes is formed between the overlapping metal wire rods. Therefore, the fluid can pass in the various directions. In the hollow cylindrical filter formed by winding the metal wire rod in a spiral and multilayered manner, the fluid reliably passes through the filter in the inner/outer diameter directions with the plurality of communication paths formed between the metal wire rods in a net-like manner. In the conventional hollow cylindrical filter, the metal wire rods that configure the adjacent wire rod layers closely adhere to each other at the intersection portion. Therefore, it is difficult to smoothly move the fluid in directions other than the inner/outer diameter directions.

According to the present embodiment, the space formed by the metal wire rod and the recesses of the metal wire rod overlapping with the aforementioned metal wire rod allows communication between the communication paths, in addition to the plurality of communication paths formed by the plurality of metal wire rods in a net-like manner. Therefore, the complicated and irregular passages in the radial direction, the peripheral direction, and the axial direction can be three-dimensionally formed in the filter. As a result, the contact area between the fluid and the metal wire rod is remarkably increased, and the fluid passes through a wide range of the filter, whereby a capture rate of the foreign substance and filtration efficiency can be improved.

Note that the filter may be used to cause the fluid to flow from up to down or from down to up in FIG. 7A. In either case, the recess in the metal wire rod function as a pocket that capture the foreign substance in the fluid having passed the filter, and can effectively remove the foreign substance. Especially, in the latter case, the fluid moved to an opposite surface of the metal wire rod beyond the projection of the metal wire rod forms a vortex flow in the recess portion of the metal wire rod. Therefore, the speed of the fluid is locally decreased, and the foreign substance can be effectively removed.

Further, in the filter according to the present embodiment, the recess along the longitudinal direction is formed in the metal wire rod to increase a surface area per unit weight or unit volume of the metal wire rod. Therefore, downsizing and reduction of weight of the filter can be achieved. Further, the degree of hollowness is increased. Therefore, a pressure loss value is improved.

Further, the recesses are formed in the metal wire rod. Therefore, the contact area between the filter and the fluid passing through the filter is increased, and the heat exchange between the filter and the fluid can be efficiently performed. Further, the space in which the fluid pass is formed between the metal wire rod that configures one wire rod layer and the metal wire rod that configures another wire rod layer adjacent to the one wire rod layer. Therefore, the contact area between the fluid passing through the filter and the metal wire rods that configure the filter is further increased, and the heat exchange between the filter and the fluid passing through the filter is efficiently performed.

Further, the recesses are formed in the metal wire rod. Therefore, noises occurring when the fluid passes can be effectively decreased.

Modified Embodiment

Figure 9A:
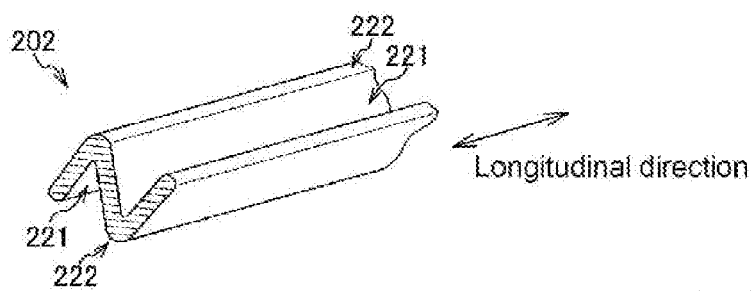
FIGS. 9A and 9B are perspective views illustrating a metal wire rod according to modifications.
Figure 9B:
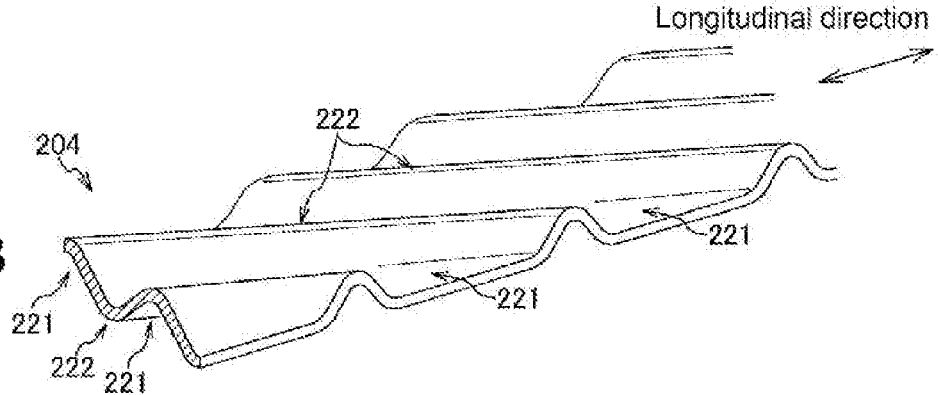

Modifications of the first embodiment will be described. FIGS. 9A and 9B are perspective views illustrating a metal wire rod according to modifications. As illustrated in FIG. 9A, a metal wire rod 202 has an approximately N-shaped (Z-shaped or S-shaped) cross-sectional shape in a direction perpendicular to a longitudinal direction, and includes a recess 221 and a projection 222 continuously extending throughout the entire length in the longitudinal direction. The recess 221 and the projection 222 are formed in a wave manner in a direction intersecting with (perpendicular to) the longitudinal direction of the metal wire rod. Such a metal wire rod can have various cross-sectional shapes. A U shape, a J shape, an L shape, an X shape, or the like may be employed, other than the N shape.

Alternatively, a metal wire rod 204 as illustrated in FIG. 9B may include a recess 221 and a projection 222 extending in a direction inclined with respect to a longitudinal direction of a wire rod. The recess 221 and the projection 222 inclined with respect to the longitudinal direction are repeated along the longitudinal direction, or a direction intersecting with (perpendicular to) the longitudinal direction.

The present embodiment can exhibit similar functions and effects to the first embodiment.

Second Embodiment

FIGS. 10A to 10C are diagrams illustrating a metal wire rod according to a second embodiment of the present invention, and FIG. 10A is a perspective view, FIG. 10B is a photograph of a side surface, and FIG. 10C is a photograph of a top surface. FIG. 11 is a schematic diagram of a rolling roller for manufacturing the metal wire rod according to the second embodiment of the present invention.

As illustrated in FIGS. 10A to 10C, a metal wire rod 205 includes recesses 221 and projections 222 repeated at a predetermined pitch along a longitudinal direction of one side (first surface), and includes a flat surface 223 in the other side (an opposite surface of the first surface, a second surface). The flat surface in this example is formed throughout the entire length in the longitudinal direction of the metal wire rod.

As illustrated in FIG. 11, the rolling device includes a gear-like rolling roller 111a in which projection portions 113 and recess portions 114 are formed at a predetermined pitch along a peripheral direction, and a columnar rolling roller 111b. The recesses 221 and the projections 222 are formed with the rolling roller 111a, and the flat surface 223 is formed with the rolling roller 111b. The recess 221 is formed to be thinner and wider than the projection 222 by being squashed by the projection portion 113 of the rolling roller 111a. On the other hand, the projection 222 is formed to be thicker and narrower than the recess 221.

Figure 12:
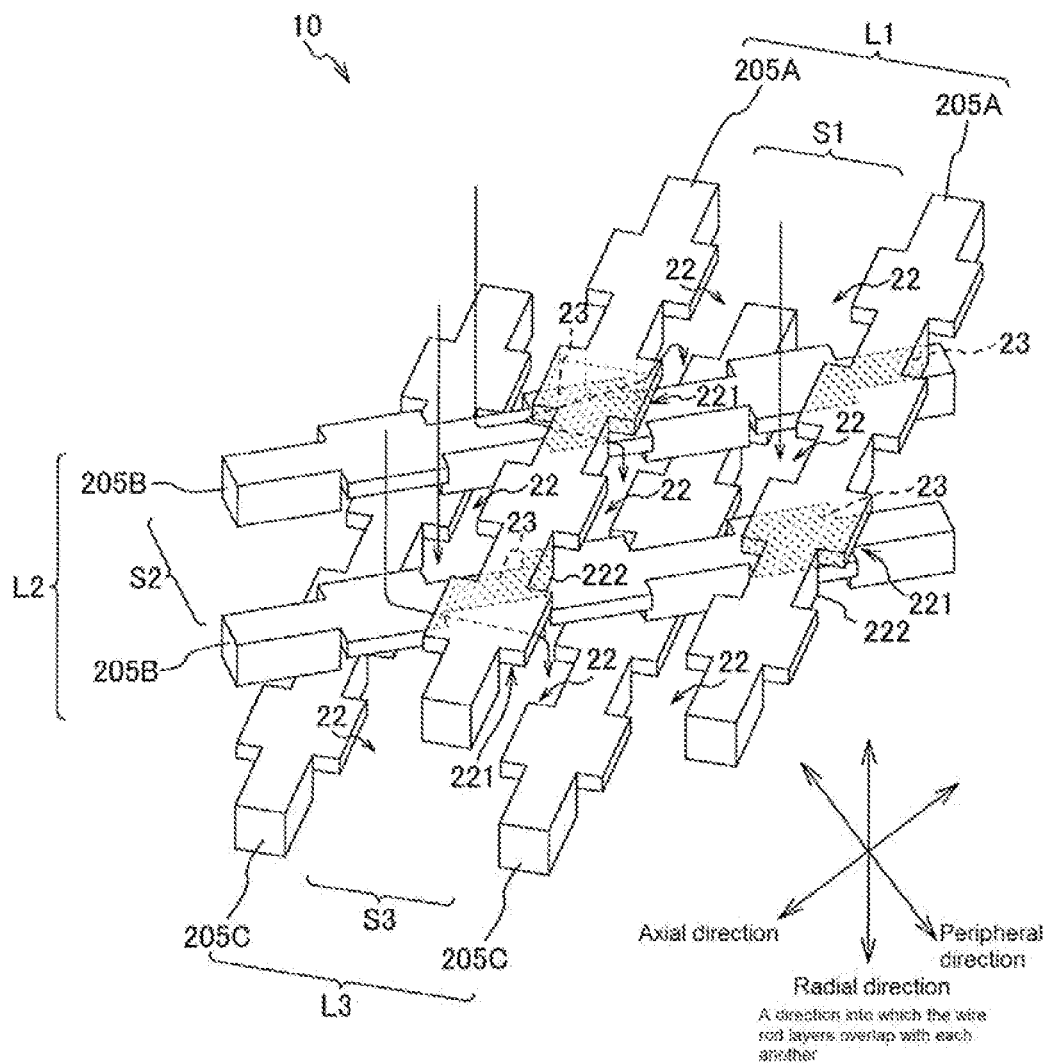
FIG. 12 is a schematic diagram illustrating an enlarged portion where the metal wire rods intersect in the filter.

FIG. 12 is a schematic diagram illustrating an enlarged portion where the metal wire rods intersect in the filter. In a filter 10, an intersection portion space 23 in which a fluid can pass is formed between the recess 221 of a metal wire rod 205A that configures one wire rod layer L1 and the flat surface 223 of a metal wire rod 205B that configures another wire rod layer L2 adjacent to the one wire rod layer L1, in an intersection portion (the shaded portion in FIG. 12) between the metal wire rod 205A and the metal wire rod 205B. The intersection portion space 23 allows the fluid to be moved in the metal wire rod 205A across a direction intersecting with (or perpendicular to) a longitudinal direction, at the intersection portion. Further, the intersection portion space 23 allows communication between a plurality of communication paths 22 extending in an overlapping direction of the wire rod layers. Therefore, in the filter 10 according to the present embodiment, the fluid can pass in a radial direction while being spread and moved in a peripheral direction and an axial direction of the filter by the intersection portion spaces 23 and the communication paths 22. Note that, in FIG. 12, the flat surface 223 side faces an upstream side of the fluid to be filtrated, and the recess 221 and the projection 222 side faces a downstream side. However, similar effects can be obtained in a reverse arrangement.

Figure 13A:
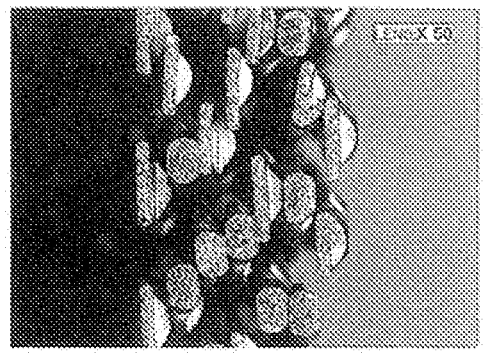
FIG. 13A is a diagram by a photograph illustrating a cross section of a filter according to a trial example using the metal wire rod illustrated in FIGS. 10A to 10C.
Figure 13B:
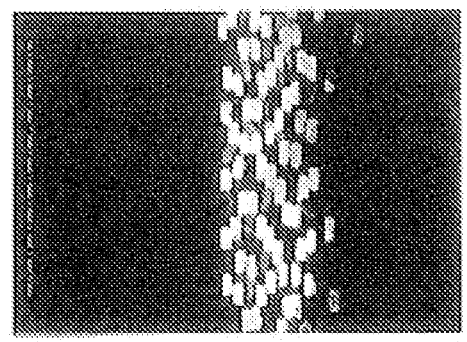
FIG. 13B is a diagram by a photograph illustrating a cross section of a filter according to a comparative example using a metal wire rod having a rectangular shape in cross section.

FIG. 13A is a diagram by a photograph illustrating a cross section of a filter according to a trial example using the metal wire rod illustrated in FIGS. 10A to 10C, and FIG. 13B is a diagram by a photograph illustrating a cross section of a filter according to a comparative example using a metal wire rod having a rectangular shape in cross section. In the up and down direction is the axial direction of the filter, the left side is an inner diameter side of the filter, and the right side is an outer diameter side in FIGS. 13A and 13B.

The filter of the trial example is produced such that the flat surface 223 comes to the inner diameter side, and the recess 221 and the projection 222 come to the outer diameter side. In the photograph, a thin portion in the right and left direction is a portion of the recess 221, and a thick portion in the right and left direction is a portion of the projection 222. The metal wire rod used for the filter of the comparative example is prepared by compressing a metal wire having a complete circular shape in cross section by two columnar rolling rollers with a flat surface to obtain the rectangular shape in cross section. In the filter of the trial example, the degree of hollowness is increased, and the pressure loss value is improved, as compared with the filter using the conventional metal wire rod having the rectangular shape in cross section according to the comparative example.

In the present embodiment, similarly to the first embodiment, complicated and irregular passages in a radial direction, a peripheral direction, and an axial direction can be three-dimensionally formed in the filter, a capture rate of a foreign substance and filtration efficiency can be improved. Further, the surface area of the metal wire rod can be increased, and thus reduction of weight, improvement of heat exchange efficiency, and a decrease in noise can be achieved. Further, in the present embodiment, the recess 221 portion that forms the intersection portion space 23 illustrated in FIG. 13A is formed to be wide by the rolling processing, and thus the contact area between the filter and the fluid passing through the intersection portion space 23 is increased, and the heat exchange efficiency is improved.

Further, in a case where the recess side of the metal wire rod is arranged to face the upstream side of the passing fluid, the recess functions as a pocket that captures the foreign substance in the fluid. In a case of a reverse arrangement, a vortex flow occurs in the recess portion when the fluid passes through the wire rod, the speed of the fluid is locally decreased, and the foreign substance can be effectively removed.

Further, the unevenness is formed in one side of the metal wire rod, and the other surface is formed into the flat surface. Therefore, sintered contact between the metal wire rods can be secured, and the filter strength can be improved.

Modified Embodiment

Modifications of the second embodiment will be described.

Figure 14A:
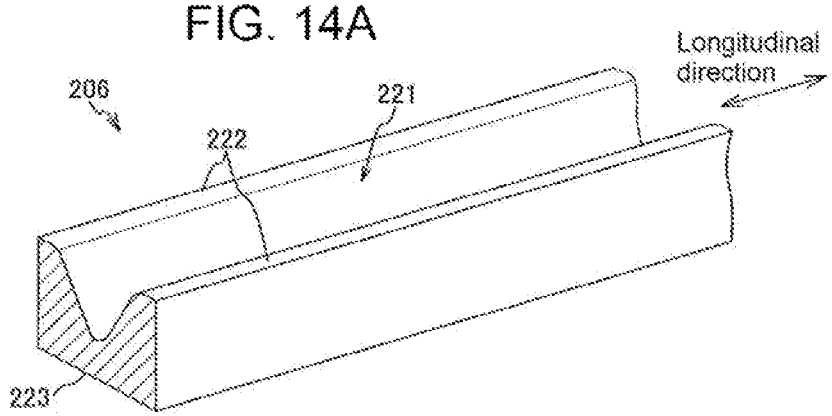
FIGS. 14A and 14B are perspective views illustrating a metal wire rod according to modifications.
Figure 14B:
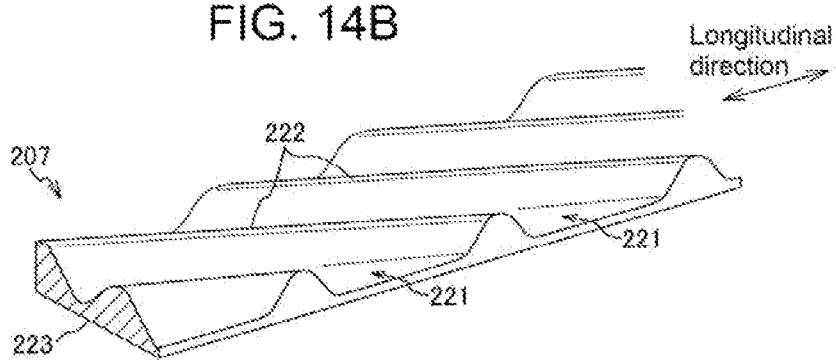

FIGS. 14A and 14B are perspective views illustrating a metal wire rod according to modifications. In a case of forming a recess in one side of the metal wire rod, and a flat surface on the other side, the recess-forming side can have any form. As illustrated in FIG. 14A, one recess 221 and two projections 222 continuously extending throughout the entire length in a longitudinal direction can be formed in one side of a metal wire rod 206. Further, as illustrated in FIG. 14B, a plurality of recesses 221 and projections 222 extending in a direction inclined with respect to a longitudinal direction may be formed in one side of a metal wire rod 207.

Since the unevenness is formed in the one side of the metal wire rod, and the other surface is formed into the flat surface, sintered contact between the metal wire rod can be secured, and the filter strength can be improved.

Figure 15A:
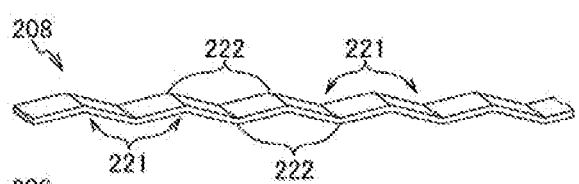
FIGS. 15A to 15C are perspective views illustrating a metal wire rod according to other modifications.
Figure 15B:
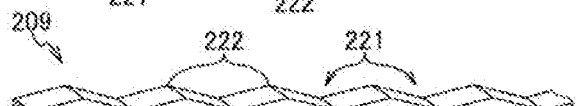
Figure 15C:
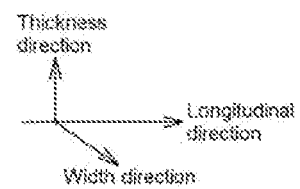
Figure 15C:
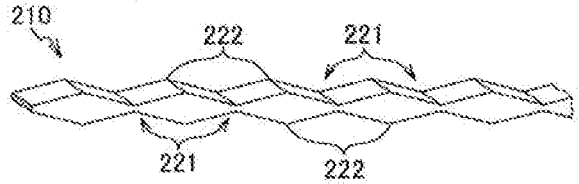

FIGS. 15A to 15C are perspective views illustrating a metal wire rod according to other modifications. In a case of forming, in a metal wire rod, recesses 221 and projections 222 repeated at a predetermined pitch, the recesses 221 and the projections 222 may be alternately formed in both sides of a metal wire rod such that the thickness of a metal wire rod 208 becomes approximately constant, as illustrated in FIG. 15A. That is, FIG. 15A illustrates an example in which a front surface of a metal wire rod having an approximately rectangular cross-sectional shape forms a zigzag shape.

Further, as illustrated in FIG. 15B, recesses 221 and projections 222 are alternately continuously formed in one side of a metal wire rod 209, and the other side may be formed into a flat surface 223.

Further, as illustrated in FIG. 15C, a configuration in which the thickness of a metal wire rod 210 is increased and decreased, that is, a configuration in which a thick portion and a thin portion are repeated. Recesses and projections may be formed in a wave manner, as illustrated in FIG. 15C.

In the examples illustrated in FIGS. 15A to 15C, the unevenness, or the thin portion and the thick portion are repeated along the longitudinal direction of the metal wire rod. However, the unevenness, or the thin portion and the thick portion may be repeated in a direction intersecting with (perpendicular to) the longitudinal direction of the metal wire rod.

Third Embodiment

Figure 16:
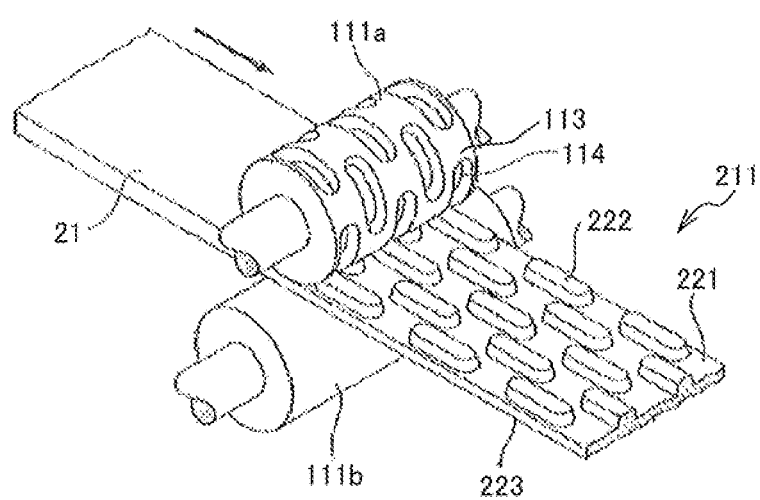
FIG. 16 is a perspective view of a metal wire rod and a rolling roller for manufacturing the metal wire rod according to a third embodiment of the present invention.

FIG. 16 is a perspective view of a metal wire rod and a rolling roller for manufacturing the metal wire rod according to a third embodiment of the present invention.

A metal wire rod that forms a hollow cylindrical filter can be a belt-like wire rod having a plurality of recesses and projections formed in a surface (plane). The illustrated metal wire rod 211 includes recesses 221 and projections 222 in one surface, and a flat surface 223 in the other surface. However, the metal wire rod may have the recesses and projections in both surfaces of the metal wire rod.

The metal wire rod 211 can be produced by pressing the belt-like metal wire rod 211 by a rolling roller 111a having projection portions 113 and recess portions 114 formed in an outer peripheral surface, and a columnar rolling roller 111b. Note that the belt-like metal wire rod 211 can be obtained by rolling a metal wire having a complete circular shape in cross section, as illustrated in FIG. 4A.

In a case of producing a hollow cylindrical filter as illustrated in FIG. 1, using the metal wire rod 211, the surface where the recesses and projections are formed is brought to face an inner diameter side or an outer diameter side.

In a case of producing the hollow cylindrical filter using the metal wire rod according to the present embodiment, similarly to the first embodiment, complicated or irregular passages can be three-dimensionally formed, and a capture rate of a foreign substance and filtration efficiency can be improved. Further, a surface area per unit weight of the metal wire rod can be increased. Therefore, downsizing, reduction of weight, improvement of heat exchange efficiency, and a decrease in noise of the filter can be achieved. Further, in a case of forming the flat surface in the metal wire rod, sintered contact between the metal wire rods can be secured, and thus the filter strength can be improved.

Fourth Embodiment

Figure 17A:
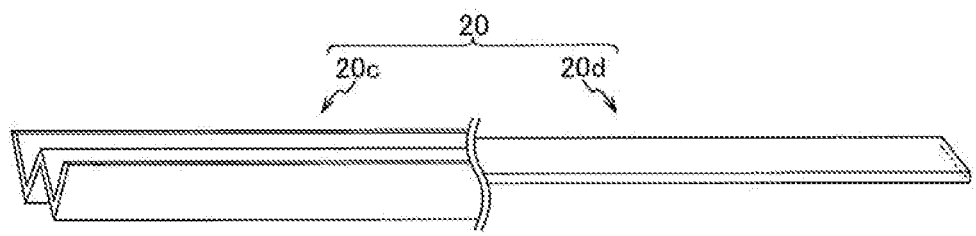
FIGS. 17A and 17B are diagrams for describing a hollow cylindrical filter according to a fourth embodiment of the present invention.
Figure 17B:
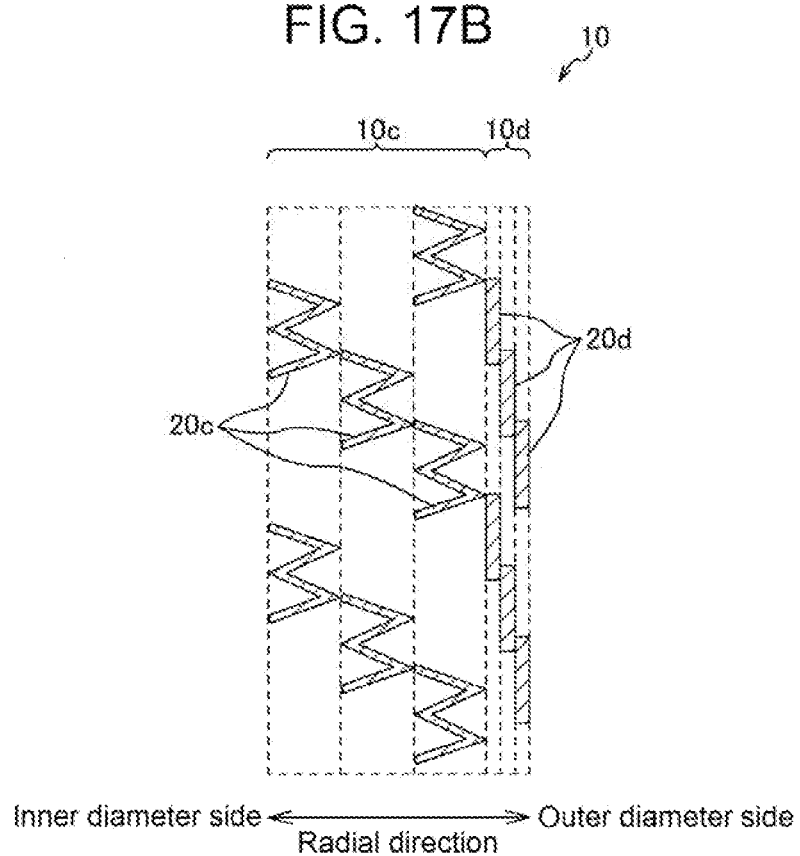

FIGS. 17A and 17B are diagrams for describing a filter according to a fourth embodiment of the present invention, and FIG. 17A is a schematic diagram of a metal wire rod that configures the filter and FIG. 17B is a sectional view of the filter. The filter according to the present embodiment is characterized in that one metal wire rod that forms one filter includes a plurality of metal wire rod portions having different external shapes or cross-sectional shapes.

A metal wire rod 20 that configures a filter 10 includes a first metal wire rod portion 20c extending in a longitudinal direction, and a second metal wire rod portion 20d arranged in a different position from the first metal wire rod portion 20c in the longitudinal direction, and having a different external shape or a different cross-sectional shape. For example, the metal wire rod 20 illustrated in FIG. 17A has a configuration divided into two portions in the longitudinal direction by the first metal wire rod portion 20c and the second metal wire rod portion 20d. The cross-sectional shape of the first metal wire rod portion 20c in a direction perpendicular to the longitudinal direction is an approximate W shape, and is a similar shape to the metal wire rod 201 illustrated in FIG. 5. The cross-sectional shape of the second metal wire rod portion 20d in the direction perpendicular to the longitudinal direction is an approximately rectangular shape, and is a similar shape to the metal wire rod 301 according to the conventional example illustrated in FIG. 7B. That is, recesses 221 (see FIG. 5) are formed in at least one of the metal wire rod portions that configure the metal wire rod 20 (here, the one is the first metal wire rod portion 20c).

The metal wire rod 20 may be divided into three portions or more in the longitudinal direction, and the first metal wire rod portions 20c and the second metal wire rod portions 20d may be alternately repeated. In this case, the lengths of the first metal wire rod portion 20c and the second metal wire rod portion 20d are appropriately determined on the basis of performance and effects required for the filter.

The filter 10 illustrated in FIG. 17B includes an inner layer 10c formed of the first metal wire rod portion 20c and an outer layer 10d formed of the second metal wire rod portion 20d. That is, a predetermined number of wire rod layers from the start of winding of the filter 10 is formed of the first metal wire rod portion 20c, and then a predetermined number of wire rod layers to the end of winding is formed of the second metal wire rod portion 20d. Here, the inner layer 10c and the outer layer 10d respectively include a single number of or a plurality of wire rod layers.

The inner layer 10c and the outer layer 10d of the filter 10 have functions and effects according to the shape of the metal wire rod portion included in the layer. That is, the inner layer 10c of the filter 10 can achieve improvement of air permeability, improvement of heat exchange rate, reduction of weight, and the like, as described in the first embodiment, by the first metal wire rod portion 20c that configures the inner layer 10c.

Further, the second metal wire rod portion 20d that configures the outer layer 10d includes the flat surface on an inner diameter side and an outer diameter side of the filter, and thus can make a contact area between the metal wire rods that configure adjacent wire rod layers large. Therefore, sintered contact between the metal wire rods when the filter 10 is sintered can be secured, and thus the filter strength, especially, the strength of the filter in an axial direction can be improved. Further, the second metal wire rod portion 20d has a thinner thickness in inner/outer diameter directions than the irregular wire rod like the first metal wire rod portion 20c, and thus a decrease in thickness of the filter can be achieved.

As described above, one filter 10 includes a plurality of types of metal wire rod portions having different cross-sectional shapes or different external shapes, thereby to complexly exert effects exhibited by the respective metal wire rod portions.

Note that the number of metal wire rod portions included in the one metal wire rod may be three or more. That is, a third and subsequent metal wire rod portions may exist. Further, an underformed portion (for example, a round wire) may be included in the metal wire rod portions. In a case where the metal wire rod includes three or more metal wire rod portions, metal wire rod portions having the same external shape may be included, or all the metal wire rod portions may have different external shapes from one another.

Further, the numbers of wire rod layers formed of the respective metal wire rod portions, ratios of the thickness in a radial direction of the wire rod layers formed of the respective metal wire rod portions, and the like are appropriately determined on the basis of performance and effects required for the filter.

Further, a portion close to one end in the axial direction of the filter may be formed of only the first metal wire rod portion, and a portion close to the other end in the axial direction of the filter may be formed of only the second metal wire rod portion. That is, portions divided into a plurality of portions in the axial direction of the filter may be formed of respective metal wire rod portions. That is, the first metal wire rod portion and the second metal wire rod portion may co-exist in one wire rod layer in different positions in the axial direction.

Filter Manufacturing Apparatus and Manufacture Method 2

Figure 18A:
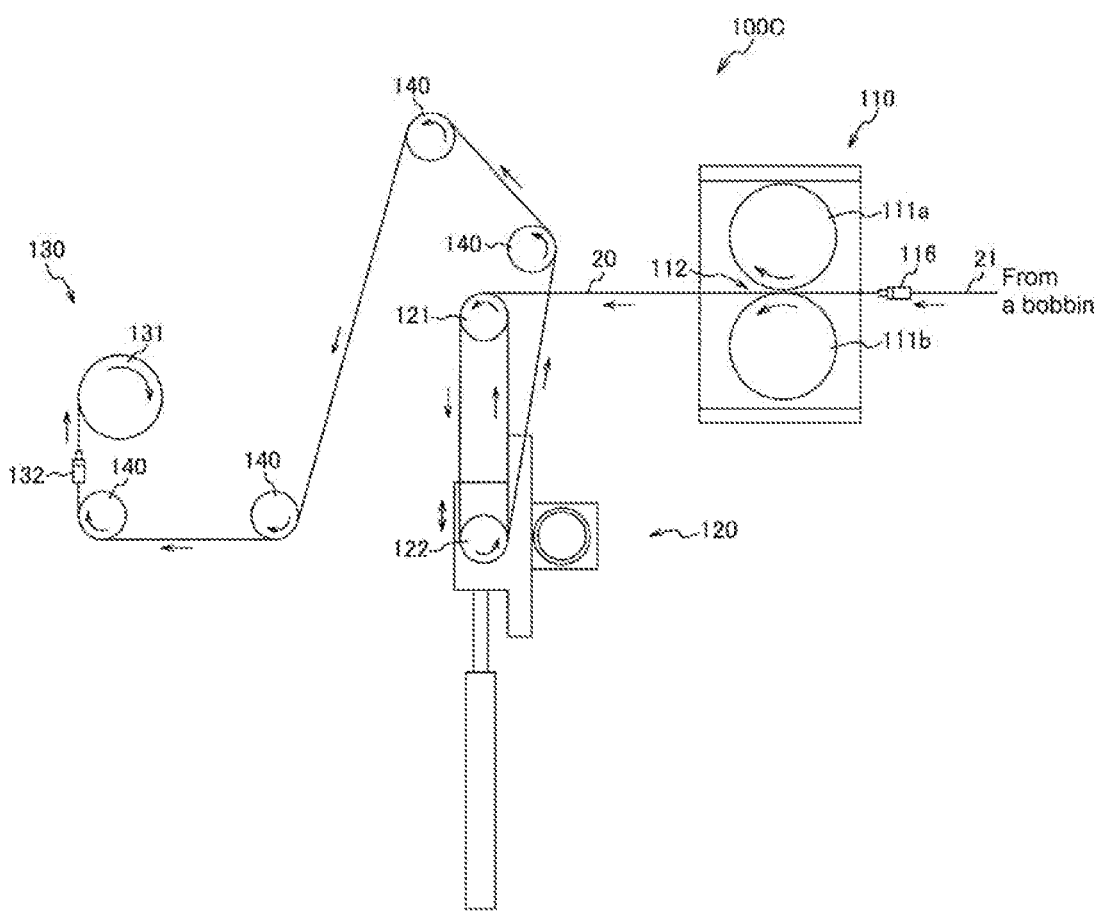
FIG. 18A is a schematic diagram illustrating an example of a filter manufacturing apparatus.
Figure 18B:
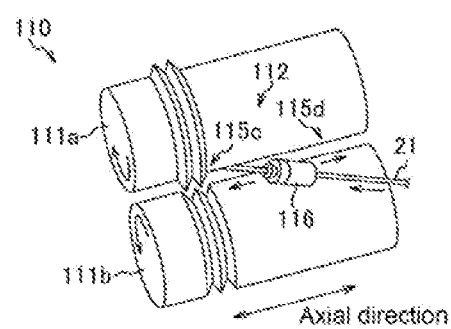
FIG. 18B is a schematic perspective view of a rolling device.

A hollow cylindrical filter manufacturing apparatus according to the fourth embodiment of the present invention will be described on the basis of FIGS. 18A and 18B. FIG. 18A is a schematic diagram illustrating an example of a filter manufacturing apparatus, and FIG. 18B is a schematic perspective view of a rolling device. Note that the same configuration as FIG. 2 is denoted with the same reference sign, and its description is omitted.

A rolling device 110 that configures a manufacturing device 100C includes a pair of rolling rollers 111a and 111b arranged to face each other. The pair of rolling rollers 111a and 111b includes a first metal wire rod forming portion 115c that forms the first metal wire rod portion 20c and a second metal wire rod forming portion 115d that forms the second metal wire rod portion 20d as a pressurizing portion 112 in different positions in the axial direction. Further, the rolling device 110 includes a guide nozzle 116 (guide means) that moves forward and backward along the axial direction of the pair of rolling rollers 111a and 111b along the axial direction, and guides the metal wire 21 to the first metal wire rod forming portion 115c or the second metal wire rod forming portion 115d.

The metal wire rod forming portions 115c and 115d respectively have shapes according to the external shapes of the metal wire rod portions to be produced. For example, the first metal wire rod forming portion 115c as a shape similar to the pressurizing portion 112 illustrated in FIG. 6. Further, the second metal wire rod forming portion 115d is formed by arranging two columnar rollers separated by a distance corresponding to the thickness of the second metal wire rod portion 20d.

An operation of the manufacturing device 100C will be described. For example, the filter 10 illustrated in FIGS. 17A and 17B is formed as follows.

First, the guide nozzle 116 is moved to a position of the first metal wire rod forming portion 115c to which the metal wire 21 is guided. The first metal wire rod forming portion 115c of the rolling rollers 111a and 111b rolls the metal wire 21 to form the first metal wire rod portion 20c. The first metal wire rod portion 20c is wound around a core rod 131 to form the inner layer 10c at a downstream side in a traveling direction.

Next, the guide nozzle 116 is moved to a position of the second metal wire rod forming portion 115d to which the metal wire 21 is guided in time with completion of the formation of a desired number of wire rod layers by the first metal wire rod portion 20c. The second metal wire rod forming portion 115d of the rolling rollers 111a and 111b rolls the metal wire 21 to form the second metal wire rod portion 20d. The second metal wire rod portion 20d is wound around the core rod 131 to form the outer layer 10d at the downstream side in the traveling direction of the metal wire rod 20.

After a desired number of wire rod layers is formed of the second metal wire rod portion 20d, the metal wire rod 20 is cut, then, a cut end portion is joined to an appropriate place of the wound-up wire rod by spot welding or the like, and the metal wire rod 20 is removed from the core rod 131, whereby a hollow cylindrical body is obtained. The hollow cylindrical body may be used as a filter as it is, or sintering processing may be further applied to the hollow cylindrical body.

The above-descried rolling device may include three or more metal wire rod forming portions according to the number of metal wire rod portions to be included in the hollow cylindrical filter. Further, one of the metal wire rod forming portions may include a metal wire rod forming portion that causes the metal wire to pass without deforming the metal wire.

As described above, the guide nozzle that sends out the metal wire is moved forward and backward in the axial direction of the rolling roller with respect to the rolling roller including the plurality of metal wire rod forming portions, whereby the metal wire rod portion having different external shape or different cross-sectional shapes can be produced by the pair of rolling rollers. Further, in a case where the hollow cylindrical filter includes a plurality of types of metal wire rod portions, the hollow cylindrical filter can be produced from one continuous metal wire. Therefore, the manufacturing process is not complicated.

Summary of Functions and Effects of Present Invention

The present invention has been described on the basis of the embodiments. The recesses may be formed to change the position in the peripheral direction according to the position in the longitudinal direction of the metal wire rod. Further, the above-described embodiments may be combined and implemented unless otherwise contradicted by context. For example, a recess continuously extending throughout the entire length in a longitudinal direction as illustrated in the first embodiment may be formed in one side of a metal wire rod, and recesses and projections repeated along the longitudinal direction as illustrated in the second embodiment may be formed in the other side of the metal wire rod.

First Aspect

The present aspect is a hollow cylindrical filter 10 formed by winding a metal wire rod 20 having a recess 221 formed throughout the entire length in a longitudinal direction, or having recesses 221 repeated (intermittently arranged) along the longitudinal direction, in a spiral and multilayered manner. The metal wire rods that configure wire rod layers extend in a direction inclined with respect to an axial direction of the hollow cylindrical filter, and the metal wire rods that configure adjacent wire rod layers extend in directions intersecting with each other, thereby to form a plurality of communication paths 22 that mainly communicates in a direction into which the wire rod layers overlap with one another, and a space that allows the plurality of communication paths to communicate with one another is formed between the recess of the metal wire rod that configures one wire rod layer and the metal wire rod that configures another wire rod layer adjacent to the one wire rod layer.

The recesses are formed in the metal wire rod, and thus an intersection portion space 23 can be formed between the recess of the metal wire rod that configures one wire rod layer and the metal wire rod that configures another wire rod layer adjacent to the one wire rod layer. The space allows the communication paths that mainly communicate in the direction into which the wire rod layers overlap with each other to communicate in the axial direction and a radial direction. Therefore, the complicated passages can be formed in the filter, and a foreign substance can be efficiently removed. Further, the recesses are formed in the metal wire rod. Therefore, a surface area per unit weight of the metal wire rod is increased, and downsizing, reduction of weight, improvement of heat exchange effectiveness, and a decrease effect of noise occurring by the fluid that passes through the filter can be obtained.

Second Aspect

In a filter 10 according to the present aspect, a metal wire rod 20 has a recess 221 and a projection 222 formed in a wave manner in a direction intersecting with a longitudinal direction of a metal wire rod.

In the present aspect, complicated passages can be formed in the filter, and a foreign substance can be efficiently removed by an intersection portion space 23 formed between a recess of a metal wire rod that configures one wire rod layer and a metal wire rod that configures another wire rod layer adjacent to the one wire rod layer. Further, the recesses are formed in the metal wire rod. Therefore, a surface area per unit weight of the metal wire rod is increased, and downsizing, reduction of weight, improvement of heat exchange effectiveness, and a decrease effect of noise occurring by the fluid that passes through the filter can be obtained.

Third Aspect

In a filter 10 according to the present aspect, a metal wire rod 20 includes thick narrow portions and thin wide portions repeated (intermittently arranged) along a longitudinal direction.

A contact area between the filter and a fluid is increased in the thin wide portion. Therefore, heat exchange efficiency can be increased.

Fourth Aspect

In a filter 10 according to the present aspect, a back side of a metal wire rod 20 in which a recess 221 is formed is a flat surface 223.

Sintered contact between metal wire rods can be secured, and the filter strength can be improved.

Fifth Aspect

In a filter 10 according to the present aspect, a metal wire rod 20 is arranged such that a recess 221 faces an upstream side of a fluid to be filtrated.

With the arrangement of the recess at the upstream side, the recess functions as a pocket that captures a foreign substance in the fluid, and can effectively remove the foreign substance.

Sixth Aspect

In a filter 10 according to the present aspect, a metal wire rod 20 is arranged such that a recess 221 faces a downstream side of a fluid to be filtrated.

With the arrangement of the recess at the downstream side, a vortex flow occurs in the recess portion when the fluid passes through the wire rod and a speed of the fluid is locally decreased, and the foreign substance can be effectively removed.

Seventh Aspect

The present aspect is a hollow cylindrical filter 10 formed by winding a metal wire rod 20 in a spiral and multilayered manner. The metal wire rods that configure wire rod layers extend in a direction inclined with respect to an axial direction of the hollow cylindrical filter, and the metal wire rods that configure adjacent wire rod layers extend in directions intersecting with each other, thereby to form a plurality of communication paths 22 that communicates in a direction into which the wire rod layers overlap with one another, and a space that allows the plurality of communication paths to communicate with one another is formed by a recess 221 formed in the metal wire rod that configures at least one wire rod layer between the metal wire rod that configures one wire rod layer and the metal wire rod that configures another wire rod layer adjacent to the one wire rod layer.

The present aspect exhibits functions and effects similar to those of the first aspect.

Eighth Aspect

In a filter 10 according to the present aspect, a metal wire rod 20 includes a recess 221 formed along a longitudinal direction.

The present aspect exhibits functions and effects similar to those of the first aspect.

Ninth Aspect

In a filter 10 according to the present aspect, a metal wire rod 20 includes recesses 221 repeated (intermittently arranged) along a longitudinal direction.

The present aspect exhibits functions and effects similar to those of the first aspect.

Tenth Aspect

In a filter 10 according to the present aspect, a metal wire rod 20 includes a first metal wire rod portion 20c extending in a longitudinal direction, and a second metal wire rod portion 20d arranged in a different position from the first metal wire rod in the longitudinal direction, and having a different external shape, and a recess 221 is formed in at least one of the metal wire rod portions.

According to the present aspect, a plurality of types of metal wire rod portions having different external shapes is included in one hollow cylindrical filter. Therefore, a hollow cylindrical filter complexly exerts functions and effects caused by the metal wire rod portions having the respective shapes.

Note that a space that allows a plurality of communication paths formed by the recess to communicate with one another may be a space formed between a wire rod layer formed by the metal wire rod portion having the recess, and a wire rod layer formed by a metal wire rod portion not having the recess.

Eleventh Aspect

A hollow cylindrical filter manufacturing apparatus 100C described in the tenth aspect includes a rolling device 110 including a pair of rolling rollers 111a and 111b arranged to face each other, and which sandwiches a metal wire 21 and forms a metal wire rod having a predetermined cross-sectional shape metal wire 21, and a winding device 130 that winds the metal wire rod 20 formed by the rolling device around a core rod 131 to form a hollow cylindrical body. The pair of rolling rollers includes a first metal wire rod forming portion 115c that forms a first metal wire rod portion 20c and a second metal wire rod forming portion 115d that forms a second metal wire rod portion 20d in different positions in an axial direction. The rolling device includes guide means (guide nozzle 116) that moves forward and backward along the axial direction of the pair of rolling rollers to guide the metal wire to the first metal wire rod forming portion or the second metal wire rod forming portion.

According to the present aspect, the guide nozzle that sends out the metal wire is moved forward and backward in the axial direction of the rolling roller with respect to the rolling roller including the plurality of metal wire rod forming portions, whereby the metal wire rod portion having different external shape or different cross-sectional shapes can be produced by the pair of rolling rollers. Further, in a case where a hollow cylindrical filter includes a plurality of types of metal wire rod portions, the hollow cylindrical filter can be produced from one continuous metal wire. Therefore, the manufacturing process is not complicated.

The invention claimed is:

1. A hollow cylindrical filter formed by winding a metal wire rod in a spiral and multilayered manner, and is configured to filter a fluid by passing it in a diameter direction to an inner diameter side or an outer diameter side, wherein:

the metal wire rod has at least one projection portion formed of a first plate member and a second plate member and at least one recess portion formed of the first plate member and the second plate member at an opposite side of the projection portion, in such a manner that the metal wire rod has a cross-section having a form of a V-shape, a N-shape, a Z-shape or a W-shape, in a longitudinal direction throughout an entire length of the metal wire rod, the cross-section being obtained by cutting off the metal wire rod at a right angle to a longitudinal axis of the metal wire rod, the metal wire rod is wound so that one side thereof faces the inner diameter side or the outer diameter side in the diameter direction, while another side faces the outer diameter side or the inner diameter side in the diameter direction, and extends in a direction inclined with respect to an axial direction of the hollow cylindrical filter, the metal wire rod of the adjacent wire rod layers extends in a direction intersecting with each other with a fixed inclined angle with respect to the axial direction, to form a plurality of communication paths communicating in a direction into which the wire rod layers overlap with each other, and an intersection portion space that allows the plurality of communication paths to communicate with each other is formed by overlapping the recess portion formed in the metal wire rod of one of the wire rod layers, with the metal wire rod of a wire rod layer adjacent to the one wire rod layer at an intersection portion of the metal wire rod of the one wire rod layer and the metal wire rod of the other wire rod layer adjacent to the one wire rod layer.

2. The hollow cylindrical filter according to claim 1, wherein the metal wire rod has the cross section having the form of the W-shape.

3. The hollow cylindrical filter according to claim 1, wherein the metal wire rod is arranged such that the recess portion faces an upstream side of the fluid.

4. The hollow cylindrical filter according to claim 1, wherein the metal wire rod is arranged such that the recess portion faces a downstream side of the fluid.

5. The hollow cylindrical filter according to claim 1, wherein the first plate member and the second plate member have a constant thickness in the longitudinal direction throughout the entire length of the metal wire rod.

6. The hollow cylindrical filter according to claim 1, wherein the metal wire rod is wound so that the recess portion constantly faces the inner diameter side or the outer diameter side in the diameter direction of the hollow cylindrical filter.

\* \* \* \* \*